United States Patent [19]

Blum et al.

[11] Patent Number: 5,089,565
[45] Date of Patent: Feb. 18, 1992

[54] PROCESS FOR THE PREPARATION OF CURABLE BINDER COMBINATIONS, THE COMBINATIONS OBTAINABLE BY THIS PROCESS AND THE USE THEREOF

[75] Inventors: Harald Blum, Wachtendonk; Christian Wamprecht, Neuss; Josef Pedain, Cologne; Michael Sonntag, Odenthal, all of Fed. Rep. of Germany

[73] Assignee: Bayer Aktiengesellschaft, Leverkusen, Fed. Rep. of Germany

[21] Appl. No.: 358,448

[22] Filed: May 30, 1989

[30] Foreign Application Priority Data

Jun. 11, 1988 [DE] Fed. Rep. of Germany ....... 3819942

[51] Int. Cl.⁵ .......................... C08C 19/22; C08F 8/32
[52] U.S. Cl. .................................... 525/375; 526/271; 528/44
[58] Field of Search .................. 526/271; 525/375; 528/44

[56] References Cited

U.S. PATENT DOCUMENTS 4,539,376  9/1985  Goel et al. .................. 525/375
4,677,167  6/1987  Goel .......................... 525/327.6

Primary Examiner—Joseph L. Schofer
Assistant Examiner—Alex H. Walker
Attorney, Agent, or Firm—Connolly and Hutz

[57] ABSTRACT

A moisture-curing binder composition useful in paints and other coating compositions is prepared by mixing or mixing with spontaneous reaction in the absence of moisture A) 30 to 99 parts by weight of at least one compound containing at least two intramolecular carboxylic anhydride groups and B) 1 to 70 parts by weight of organic compounds having blocked amino groups, wherein B)

comprises organic compounds containing hydrogen atoms which are reactive to acid anhydride groups and containing bicyclic amide acetal or bicyclic amide groups or both, wherein the ratios of the amounts of the individual components are chosen such that, by taking into account the addition reaction which occurs spontaneously between components A) and B) in the absence of moisture, in the resulting mixture 0.25 to 50 anhydride groups are present per bicyclic amide acetal and bicyclic amide aminal group.

13 Claims, No Drawings

PROCESS FOR THE PREPARATION OF CURABLE BINDER COMBINATIONS, THE COMBINATIONS OBTAINABLE BY THIS PROCESS AND THE USE THEREOF

The present invention relates to a process for the preparation of binder combinations which are curable, if necessary under the influence of moisture, and essentially consisting of organic compounds containing at least two intramolecular carboxylic anhydride groups and compounds containing bicyclic amide acetals or bicyclic amide aminals, to the combinations obtained by this process and their use as paints or coating compounds curable under the influence of moisture or for the preparation of paints or coating compounds of this type.

BACKGROUND OF THE INVENTION

The use of combinations of organic compounds having at least two intramolecular carboxylic anhydride groups per molecule, in particular of copolymers containing succinic anhydride and polyhydroxyl compounds as binders for paints and coating compounds has already been disclosed in EP-A-48,128. The idea of applying the principle of this prior art publication to the reaction of amines with anhydrides fails, however, due to the fact that the reaction of amines with anhydrides is a reaction which proceeds very quickly even at room temperature and leads to crosslinked products with the cleavage of anhydrides. The extremely short pot lives resulting therefrom have until now prevented the concomitant use of polyanhydrides and polyamines in coating systems.

A possible solution is described in DE-OS (German Published Specification) 2,853,477. This publication describes mixtures of blocked polyamines and polyanhydrides which have good pot lives but are cured upon addition of water to give crosslinked products. The suitable blocked polyamines described are ketimines or aldimines which are obtained by reaction of polyamines with ketones or aldehydes.

The polyanhydrides mentioned are compounds having at least 2 cyclic carboxylic anhydride groups in the molecule, in particular reaction products of polyols with cyclic dianhydrides in a hydroxyl/anyhdride group ratio of 1:2, or copolymers of an unsaturated cyclic anhydride with poly-unsaturated compounds or α-olefins.

The olefinically unsaturated compounds to be used in the preparation of the copolymers are deal with in the general description of DE-OS (German Published Specification) 2,853,477 only in a very generalized manner; in particular no mention is made of the ratios of amounts of the individual monomers to be used in the preparation of the copolymers. The concrete disclosure of the exemplary embodiments is limited to copolymers of butadiene oil and maleic anhydride in a ratio of 1:1 and to copolymers of tung oil with maleic anhydride. However, these copolymers have disadvantages, since their combination with bisketimines or bisaldimines eventually lead to strongly discoloured products. Besides coating agents containing unsaturated oils such as butadiene oil or tung oil as binder component give coatings which have a strong tendency to embrittle and are not weatherproof.

In addition, as seen in the exemplary embodiments of DE-OS (German Published Specification) 2,853,477, dimethylformamide has to be used as solvent for the processing of the binders described specifically in this publication, in which also unacceptable solids contents of merely about 20% are used.

A further possibility of increasing the pot lives is the use oxazolanes instead of amines.

The principle of water-curable compositions of oxazolanes and polyanhydrides are known from DE-OS (German Published Specification) 2,610,406. In this publication, oxazolanes are combined with polyanhydrides for water-curable sealing and adhesive substances. Polyanhydrides described as suitable are reaction products of poly-unsaturated fatty acids with maleic anhydride and polyanhydride of $C_3$-$C_6$-alkyl (meth)acrylate and maleic anhydride, in particular butyl acrylate and maleic anhydride.

Furthermore, in-house experiments by the applicants have shown that the systems specifically described in DE-OS (German Published Specification) 2,610,406 are still very much in need of improvement with respect to the suitability for the preparation of high-quality, colourless paint films of high hardness and good resistance to solvents and chemicals. This is true not only for the systems described in the exemplary embodiments and based on copolymers of maleic anhydride and butyl acrylate but also for the systems based on the reaction products of maleic anhydride with polyunsaturated fatty acid esters, which lead to final products which become yellow.

Accordingly, the object of the invention was to provide novel binder combinations based on polyanhydrides and modified polyamines which are suitable for the preparation of high-quality systems which are curable, if necessary under the influence of air moisture, in which the binder systems have a sufficient pot life and are curable within an acceptable period of time to give clear and solvent-resistant films.

BRIEF DESCRIPTION OF THE INVENTION

It was possible to achieve this object by providing the process according to the invention in which particular polyanhydrides are combined with compounds containing bicyclic amide acetal or bicyclic amide aminal groups.

DETAILED DESCRIPTION OF THE INVENTION

The invention relates to a process for the preparation of moisture-curing binder combinations by mixing and possibly reaction in the absence of moisture of A) 30 to 99 parts by weight of at least one compound containing at least two intramolecular carboxylic anhydride groups with B) 1 to 70 parts by weight of organic compounds having blocked amino groups, with the optional concomitant use of solvents and/or other auxiliaries and additives known from paint technology, characterized in that the compound B) used comprises organic compounds containing hydrogen atoms which are reactive, if desired, towards acid anhydride groups and containing bicyclic amide acetal and/or bicyclic amide aminal groups and, if desired, in addition to these also further blocked amino groups, the ratios of the amounts of the individual components being chosen such that, by taking into account the addition reaction which may occur spontaneously between components A) and B) in the absence of moisture, in the resulting mixture 0.25 to 50 anhydride groups are present per bicyclic amide acetal and/or bicyclic amide aminal group.

The invention also relates to the binder combinations obtainable by this process.

The invention finally also relates to the use of the binder combinations obtainable by the process according to the invention as paints or coating substances which are curable under the influence of moisture or for the preparation of paints or coating substances of this type.

The starting component A) to be used in the process according to the invention can comprise any desired organic compound containing at least two intramolecular acid anhydride groups per molecule. Suitable "polyanhydrides" of this type are, for example, low-molecular-weight cyclic dianhydrides such as pyromellitic dianhydride or benzophenone-3,4,3',4'-tetracarboxylic anhydride.

Other suitable examples are graft products, Diels-Alder adducts or "ene" adducts of maleic anhydride and polyunsaturated substances, such as, for example, liquid low-molecular weight polybutadienes, butadiene copolymers, soyabean oil, linseed oil, tung oil, tall oil, castor oil, coconut oil or groundnut oil.

Other suitable compounds are products containing at least two anhydride groups obtained by reaction of at least difunctional alcohols, amines or amino alcohols with excess amounts of dianhydrides.

Preferably, compounds A) are "copolymers containing succinic anhydride" of the molecular weight range Mw of 1500 to 75,000, preferably 3000 to 50,000 and in particular 3000 to 25,000, which, in the context of the invention, are understood to mean copolymers of maleic anhydride with other olefinically unsaturated monomers of the type described in more detail below, which contain "succinic anhydride groupings" of the formula

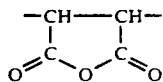

such as are incorporated in the polymer during the polymerization or copolymerization of maleic anhydride.

The preferred starting components A) comprise copolymers prepared in a known manner from a) 4.5 to 45 parts by weight of maleic anhydride, b) 15 to 90 parts by weight of monomers of the formula

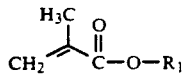 (I)

and/or

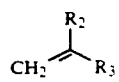 (II)

and c) 5 to 80 parts by weight of monomers of the formula

 (III)

in which, in the formulae mentioned, $R_1$ represents an aliphatic or cycloaliphatic hydrocarbon radical having 1 to 18 carbon atoms and optionally containing oxygen, sulphur or nitrogen as hetero atom, $R_2$ represents hydrogen, a methyl or ethyl group or chlorine or fluorine, $R_3$ represents an aliphatic hydrocarbon radical having 2 to 15 carbon atoms, a cycloaliphatic hydrocarbon radical having 5 to 10 carbon atoms, an araliphatic hydrocarbon radical having 7 to 18 carbon atoms, an aromatic hydrocarbon radical having 6 to 12 carbon atoms, chlorine, fluorine, a nitrile group or a hydrocarbon radical having 2 to 18 carbon atoms and containing one or more hetero atoms from the group comprising oxygen, sulphur and nitrogen in the form of ether, ester, amide, urethane, urea, thioester, thioether, oxirane, ketone, lactam or lactone groups, and $R_4$ in its meaning corresponds to the definition mentioned for $R_1$.

In a particularly preferred manner, the starting components A) according to the invention are copolymers of maleic anhydride with monomers b) and c) of the above-mentioned general formula in which $R_1$ represents a linear or branched aliphatic hydrocarbon radical having 1 to 8 carbon atoms, $R_2$ represents hydrogen or a methyl group, $R_3$ represents an aromatic hydrocarbon radical having 6 to 12 carbon atoms (this is also understood to mean aromatic radicals having aliphatic substituents), a nitrile group, a carboxylate group having 2 to 9 carbon atoms, an alkoxy group having 2 to 7 carbon atoms or an aminocarbonyl group which, on the nitrogen, can optionally carry an alkyl substituent having 1 to 6 carbon atoms and possibly ether bridges, and $R_4$ in its meaning corresponds to the definition mentioned last for $R_1$.

Typical examples of suitable or preferred radicals $R_1$ and $R_4$ are methyl, ethyl, n-propyl, isopropyl, n-butyl, isobutyl, n-pentyl, n-hexyl, 2-ethylhexyl, n-octyl, n-decyl, n-dodecyl, n-tetradecyl or n-octadecyl radicals.

Typical examples of suitable or preferred radicals $R_3$ are aliphatic radicals of the type just mentioned for $R_1$ by way of example with the exception of methyl and furthermore phenyl, cyclohexyl, 2-, 3- and 4methylphenyl, propoxy, n-butoxy, acetyl, propionyl, n-butyryl or N-methoxymethylaminocarbonyl radicals.

Particularly preferred components A) are moreover those in which a) 4.5 to 45 parts by weight, in particular 4.5 to 19 parts by weight, of maleic anhydride, b) 35 to 90 parts by weight, in particular 45 to 85 parts by weight, of monomers of the formulae

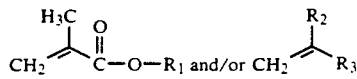

and c) 5 to 65 parts by weight, in particular 5 to 45 parts by weight, of monomers of the formula

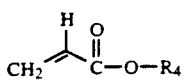

are present in copolymerized form.

Copolymers which are particularly preferably used as component A) are those which correspond to the last-mentioned definition and in which per 100 parts by weight of maleic anhydride 40 to 140 parts by weight of other monomers selected from the group comprising styrene, vinyltoluene, α-methylstyrene, α-ethylstyrene, ring-substituted diethylstyrenes, optionally consisting of isomer mixtures, isopropylstyrenes, butylstyrenes and methoxystyrenes, ethyl vinyl ether, n-propyl vinyl ether, isopropyl vinyl ether, n-butyl vinyl ether, isobutyl vinyl ether, vinyl acetate, vinyl propionate, vinyl butyrate and any desired mixtures of these monomers are present in copolymerized form, if desired, in addition to other comonomers.

The preferred component A), that is, the copolymers containing succinic anhydride in general have a weight average molecular weight of 1500 to 75,000, preferably 3000 to 50,000 and in particular 3000 to 25,000, which can be determined by the method of gel permeation chromatography. Their anhydride equivalent weight (=amount in "g" containing 1 mole of anhydride groups) is 4900 to 217, preferably 2100 to 326.

Other suitable and preferred polyanhydrides are those maleic anhydride copolymers which additionally contain epoxy groups which have been additionally incorporated.

The specific advantage of this type of copolymers is that these binder combinations can be cured by a "double cure" mechanism. First anhydride groups and epoxy groups react with the amino-functional crosslinking agents and then the carboxyl groups resulting from the reaction of anhydride with amine can react with excess epoxy groups so that the number of free carboxyl groups in the coating is reduced, high crosslinking densities are achieved at the same time and thus also very high requirements with respect to resistance to solvents and chemicals can be met.

These copolymers A) thus consist of at least one copolymer having not only epoxy groups but also intramolecular acid anhydride groups in copolymerized form, the molecular weight of these copolymers determined by the method of gel permeation chromatography being 1500 to 75,000, preferably 3000 to 50,000 and particularly preferably 3000 to 25,000. The epoxide equivalent weight (=amount in "g" containing 1 mole of epoxide groups) is 568 to 14,200, preferably 973 to 7300 and the anhydride equivalent weight (=amount in "g" containing 1 mole of anhydride groups) is 392 to 9800, preferably 817 to 3270.

These copolymers containing epoxy and anhydride groups are prepared by preferably using a monomer mixture consisting of a) 1 to 20 parts by weight of copolymerizable monomers containing anhydride groups, b) 1 to 20 parts by weight of copolymerizable monomers containing epoxy groups and c) 40 to 98 parts by weight of other copolymerizable monomers of the abovementioned general formulae (I), (II), (III) in which $R_1$ to $R_4$ have the abovementioned meaning or preferred meaning.

Typical examples of monomers a) are, for example, itaconic anhydride or maleic anhydride, maleic anhydride being preferred.

Typical examples of monomers b) are, for example, glycidyl acrylate or glycidyl methacrylate.

Typical examples of monomers c) are styrene, vinyl acetate, methyl methacrylate, n-butyl acrylate, n-butyl methacrylate, 2-ethylhexyl acrylate, ethyl acrylate, 2-ethylhexyl methacrylate and lauryl methacrylate.

The copolymers are prepared in a manner known per se by a copolymerization initiated by free radicals, preferably in the presence of organic solvents at 60° to 180° C. Suitable polymerization media are all solvents which are customary in the paint industry and are inert towards the monomers and the copolymers under the polymerization conditions.

Examples of suitable solvents are esters, such as ethyl acetate, propyl acetate, butyl acetate, isopropyl acetate, isobutyl acetate, sec.-butyl acetate, amyl acetate, hexyl acetate, benzyl acetate, ethyl propionate, butyl propionate, methylglycol acetate, ethylglycol acetate, butylglycol acetate, ethyldiglycol acetate, ethylglycol acetate methyldiglycol acetate, butyldiglycol acetate, butyrolactone, propylene glycol methyl ether acetate, for example ethers, such as diisopropyl ether, dibutyl ether, tetrahydrofuran, dioxane, dimethyl diglycol, hydrocarbons, such as benzine, terpentine oil, solvent naphtha, terpenes, hexane, heptane, octane, cyclohexane, toluene, xylene, ethylbenzene, ketones, such as acetone, methyl ethyl ketone, methyl isobutyl ketone, methyl n-amyl ketone, methyl isoamyl ketone, diethyl ketone, ethyl butyl ketone, diisopropyl ketone, cyclohexanone, methylcyclohexanone, isophorone or any desired mixtures of these solvents.

The copolymerization is usually carried out at solids contents of 30 to 95% by weight.

In general, part of the solvent or the entire amount is initially introduced into the reaction vessel, and the monomer mixture, initiator and, if desired, part of the solvent are continuously metered in. After the addition is complete, stirring of the mixture is continued for some time. The polymerization is terminated at a monomer conversion of more than 96%, preferably more than 99%. It may be necessary to carry out a subsequent activation by subsequent addition of small amounts of initiator in order to achieve the monomer conversion desired. With certain monomer starting compositions, it is possible that after the polymerization fairly large amounts of residual maleic anhydride monomers are contained in the copolymer. As reasons of costs and in the case where this would adversely affect the desired purpose of application or the performance, it is advantageous to reduce this residual monomer content either by distillation or by subsequent activation using initiator, if necessary with simultaneous addition of small amounts of a monomer mixture which is readily copolymerizable with maleic anhydride, such as, for example, styrene and butyl acrylate.

It is also possible to introduce initially part of the maleic anhydride together with the solvent or to add the maleic anhydride dropwise at a faster rate than the other monomers. These modified preparation processes can in certain cases improve the compatibility of the components of the binder combination.

The monomer conversion is found by determining the solids content of the reaction mixture and is checked by analysis of the residual monomers by gas chromatography.

Preferably, those free radical forming compounds are used which are suitable for reaction temperatures of 60° to 180° C., such as organic peroxides, for example dibenzoyl peroxide, di-tert.-butyl peroxide, dilauryl peroxide, tert.-butyl peroxy-2-ethylhexanoate, tert.-butyl peroxymaleate, tert.-butyl peroxybenzoate, dicumyl peroxide, didecanoyl peroxide, such as azo compounds, for example 2,2'-azobis-(2,4-dimethylvaleronitrile), 2,2'-azobis-(isobutyronitrile), 2,2'-azobis-(2,3-dimethylbutyronitrile), 1,1'-azobis-(1-cyclohexanenitrile).

The initiators can be used in amounts of 0.5 to 10% by weight, relative to all the monomers. If desired, molecular weight regulators, such as n-dodecylmercaptan, tert.-dodecylmercaptan and the like can be used in amounts from 0 to 10% by weight.

Component B) can comprise compounds having blocked amino groups and a molecular weight of 115 to 30,000, preferably 115 to 15,000 and in particular 115 to 6000 determined as weight average or mixtures of this type of compound. Low molecular weights of up to about 1000 can be calculated from the stoichiometry of the starting materials used for the preparation of compounds, while higher molecular weights of more than 1000 are determined by the method of gel permeation chromatography. It is an essential aspect of the invention that the compounds which constitute component B) contain on average, if appropriate in addition to other blocked amino groups, at least 0.1, preferably 0.5 to 4 and in particular 1 to 3 structural units of the general formulae (IV) (bicyclic amide acetal groups) and/or (V) (bicyclic amide aminal groups) per molecule

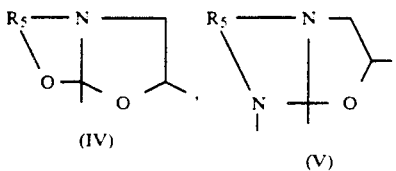

in which in these formulae

R₅ represents a divalent aliphatic hydrocarbon radical having 2 to 10 carbon atoms, with the proviso that 2 or 3 carbon atoms are present between the two hetero atoms, where this hydrocarbon radical can also contain functional groups, in particular hydroxyl groups.

Compounds which are suitable according to the invention as component B) and contain structural units of the formula (IV) can be obtained in a manner known per se by reaction of compounds containing epoxy or cyclic carbonate groups with cyclic imino esters such as, for example, oxazolines or oxazines. Preferably, the starting components in this reaction are used in such relative amounts that a total of 1.0 to 1.1 oxazoline or oxazine groups are present for each epoxy or cyclic carbonate group. This type of reactions which lead to compounds having bicyclic amide acetal groups are described in detail, for example, in R. Feinauer, Liebigs Ann. Chem. 698, 174 (1966).

In this reaction, monofunctional oxazolines or oxazines can be reacted with monofunctional epoxides or carbonates or polyfunctional oxazolines or oxazines with monofunctional epoxides or carbonates, or monofunctional oxazolines or oxazines with polyfunctional epoxides or carbonates.

The oxazolines or oxazines which are used for the preparation of the bicyclic amide acetals can be prepared by methods known from the literature, such as, for example, by reaction of carboxylic acids or anhydrides thereof with hydroxyamines with the elimination of water or by reaction of nitriles with hydroxyamines with the elimination of ammonia. This type of reactions is described, for example, in J. Org. Chem. 26, 3821 (1961), H. L. Wehrmeister, J. Org. Chem. 27, 4418 (1962) and P. Allen, J. Org. Chem. 28, 2759 (1963).

Suitable carboxylic acids are in particular aliphatic monobasic or polybasic carboxylic acids, such as, for example, formic acid, acetic acid, caproic acid, 2-ethylhexanoic acid, soya oil fatty acid or anhydrides thereof; difunctional carboxylic acids, such as, for example, succinic acid, adipic acid, azelaic acid, dimerized unsaturated fatty acids, (meth)acrylic acid copolymers, carboxyl-containing polyesters, trimellitic acid or pyromellitic acid, the preferred monocarboxylic acids being formic acid, acetic acid and propionic acid or their anhydrides and the preferred dicarboxylic acids being adipic acid, azelaic acid and dimeric fatty acids.

Examples of suitable nitriles are monofunctional nitriles such as acetonitrile or 3-hydroxypropionitrile; difunctional nitriles such as succinonitrile, adiponitrile, urethane, urea, amide or ester groups containing reaction products of 3-hydroxypropionitrile or 3-methylaminopropionitrile with diisocyanates or dicarboxylic acids; polyfunctional nitriles such as copolymers of acrylonitrile, reaction products of 3-hydroxypropionitrile or 3-methylaminopropionitrile with polycarboxylic acids or polyisocyanates, urethane groups containing reaction products of hydroxyl-containing substances with 6-isocyanatohexanecarbonitrile.

Suitable hydroxyamines are amino alcohols having primary amino groups, such as, for example, 2-aminoethanol, 3-amino-1-propanol, 1-amino-2-propanol, 4-amino-2-butanol, 2-amino-2-methylpropanol, 2-amino-2-methyl-1,3-propanediol, 2-amino-2-hydroxymethyl-1,3-propanediol, 3-amino-2-butanol or addition products of ammonia with compounds containing epoxy groups.

Oxazolines or oxazines which contain hydroxyl groups can also be converted into higher-functional oxazolines or oxazines, for example, by reaction with organic polyisocyanates, such as will be shown below in the example of oxazoline precursor 4.

For further illustration, the following oxazolines and oxazines are mentioned by way of example:

Oxazoline Precursor 1

2-Ethyl-Δ²-oxazoline: reaction product of propionic anhydride and 2-aminoethanol

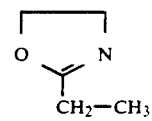

Oxazoline Precursor 2

4,4-Dimethyl-Δ²-oxazoline: reaction product of formic acid and 2-amino-2-methylpropanol

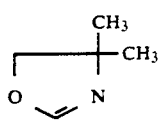

Oxazoline Precursor 3

4-Hydroxymethyl-4-methyl-Δ²-oxazoline: reaction product from formic acid and 2-amino-2-methyl-1,3-propanediol

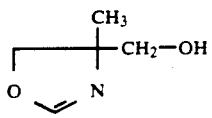

Oxazoline Precursor 4

Reaction of oxazoline precursor 3 with hexamethylene diisocyanate

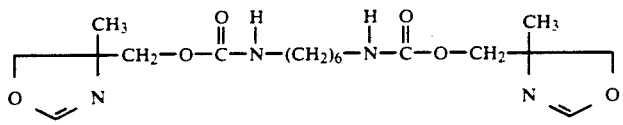

Oxazine Precursor 5

5,6-dihydro-4H-1,3-oxazine: reaction product from formic acid and 3-amino-1-propanol

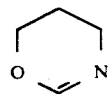

Oxazine Precursor 6

5,6-Dihydro-2-ethyl-4H-1,3-oxazine: reaction product of propionic anhydride and 3-amino-1-propanol

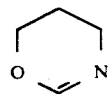

The precursors mentioned by way of example and containing oxazoline or oxazine groups are used to prepare the bicyclic amide acetals required for the preparation of the binder combinations according to the invention by reaction with epoxide or cyclic carbonates.

Examples of suitable epoxides are monoepoxides, such as glycidyl esters of Versatic acid (®Cardura E 10, Shell Chemie), 1,2-epoxybutane, cyclohexene oxide, styrene oxide, phenyl glycidyl ether, 1,2-epoxy-2-methylpropane, 1-allyloxy-2,3-epoxypropane, decyl glycidyl ether, methyl glycidyl ether, stearyl glycidyl ether, tert.-butyl glycidyl ether; 2-ethylhexyl glycidyl ether; diepoxides, such as glycerol diglycidyl ether, polyethylene glycol diglycidyl ether, diethylene glycol diglycidyl ether, neopentylglycol diglycidyl ether, diepoxides based on 4,4-(1-methylethylidene)-bisphenol, for example ®Lekutherm X 20, Bayer AG, or polyepoxides, such as glycidyl esters of polycarboxylic acids or any desired copolymers containing epoxy groups.

Examples of suitable cyclic carbonates are ethylene carbonate, propylene carbonate, glycerol carbonate or the reaction products of glycerol carbonate with diisocyanates and polyisocyanates at an NCO/OH equivalent ratio of 1:1, such as, for example, the reaction product of 2 moles of glycerol carbonate with 1 mole of 1,6-diisocyanatohexane.

Typical examples of bicyclic amide acetals which are suitable according to the invention as component B) are the following compounds:

Amide Acetal Crosslinking Agent 1

Reaction product from oxazoline precursor 1 and phenyl glycidyl ether

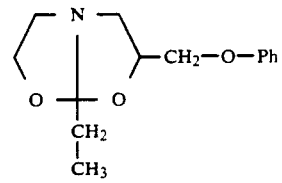

Amide Acetal Crosslinking Agent 2

Reaction product from oxazoline precursor 1 and styrene oxide

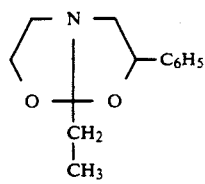

Amide Acetal Crosslinking Agent 3

Reaction product from oxazoline precursor 1 and ethylene carbonate

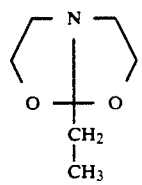

Amide Acetal Crosslinking Agent 4

Reaction product from oxazoline precursor 1 and neopentylglycol diglycidyl ether

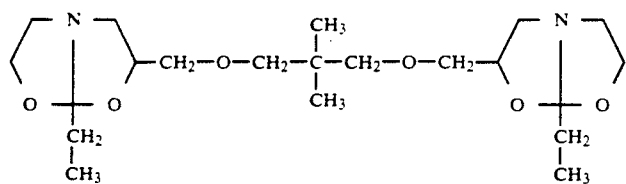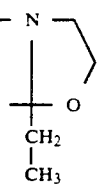

Amide Acetal Crosslinking Agent 5

Reaction product from oxazoline precursor 4 and styrene oxide

Amide Acetal Crosslinking Agent 6

Reaction product from oxazine precursor 5 and styrene oxide.

Bicyclic amide aminals which are suitable according to the invention as component B) can be obtained, for example, by reaction of tetrahydropyrimidines or dihydroimidazoles with organic epoxides or cyclic carbonates of the type already mentioned by way of example.

In this reaction, monofunctional tetrahydropyrimidines or dihydroimidazoles can be reacted with monofunctional epoxides or carbonates, polyfunctional tetrahydropyrimidines or dihydroimidazoles with monofunctional epoxides or carbonates, monofunctional tetrahydropyrimidines or dihydroimidazoles with polyfunctional epoxides or carbonates.

The tetrahydropyrimidines or dihydroimidazoles used for the preparation of the bicyclic amide aminals can be prepared by methods known from the literature, such as, for example, by reaction of carboxylic acids with diamines with the elimination of water, or by reaction of nitriles with diamines with the elimination of ammonia. This type of reaction is described, for example, in DE-OS (German Published Specification) 3,640,239.

Examples of suitable carboxylic acids are the monocarboxylic, dicarboxylic and polycarboxylic acids mentioned in the preparation of the amide acetals by way of example. Examples of suitable nitriles are the mononitriles, dinitriles and polynitriles mentioned in the preparation of the amide acetals by way of example.

Examples of suitable diamines are 1-methylaminopropaneamine, 1-ethylaminopropaneamine, 1,2-propanediamine, 1,3-propanediamine, diethylenetriamine, dipropylenetriamine, 2-(2-aminoethylamino)-ethanol.

For further illustration, the following tetrahydropyrimidines and dihydroimidazoles are mentioned by way of example:

Tetrahydropyrimidine Precursor 7

Reaction product from 1-methylaminopropanamine and acetic acid

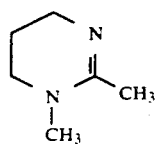

Dihydroimidazole Precursor 8

Reaction product from 2-(2-aminoethylamino)-ethanol and acetic acid

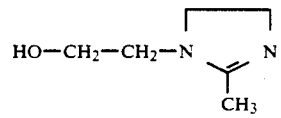

Tetrahydropyrimidine Precursor 9

Reaction product from adiponitrile and 1-methylaminopropaneamine

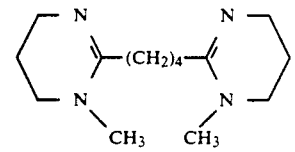

Tetrahydropyrimidine Precursor 10

Reaction product from dimeric fatty acids (for example ®Pripol 1009, Unichema) and 1-methylaminopropaneamine

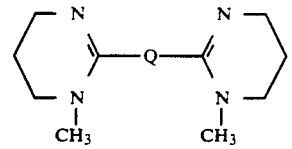

Q represents the hydrocarbon radical linking the carboxyl groups of the dimerized fatty acid.

The amino precursors mentioned by way of example and containing tetrahydropyrimidine or dihydroimidazole groups are used to obtain the amide aminals required for the preparation of the binder combinations according to the invention by reaction with epoxides or cyclic carbonates. This type of reactions is described, for example, in R. Feinauer, Angew. Chem. 78, 938 (1966).

For further illustration, the following products are mentioned by way of example:

Amide Aminal Crosslinking Agent 7

Reaction product from tetrahydropyrimidine precursor 7 and bis-glycidyl ether of bisphenol A

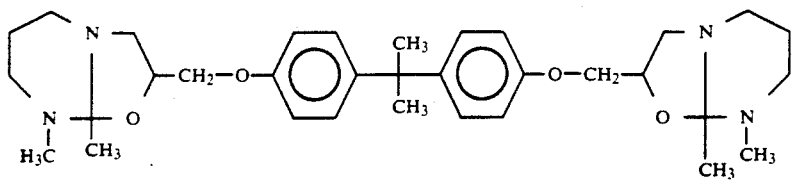

Amide Aminal Crosslinking Agent 8

Reaction product from dihydroimidazole precursor 8 and styrene oxide which is subsequently reacted with dimethyl adipate.

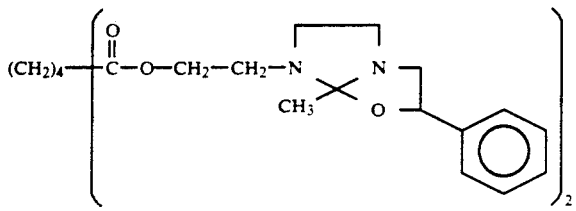

Amide Aminal Crosslinking Agent 9

Tetrahydropyrimidine precursor 10 is reacted with ®Cardura E 10 (glycidyl ester of Versatic acid; Shell Chemie)

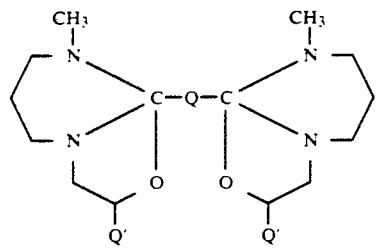

Q' formally represents the radical which is obtained from the glycidyl ester of Versatic acid by removal of the epoxy group.

In the compounds which are suitable as component B), in addition to structural units of the formulae (IV) and (V), structural units of the formulae (VI) (tetrahydroimidazole or hexahydropyrimidine groups), (VII) (oxazolane or oxazane groups) and/or (VIII) aldimine or ketimine groups can also be present.

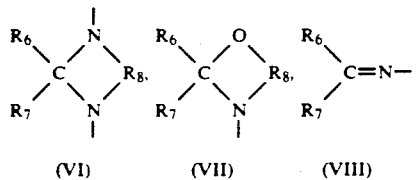

In these formulae $R_6$ and $R_7$ represent identical or different radicals and denote hydrogen, aliphatic hydrocarbon radicals having 1 to 18 carbon atoms, cycloaliphatic hydrocarbon radicals having 5 to 10 carbon atoms, araliphatic hydrocarbon radicals having 7 to 18 carbon atoms or phenyl radicals in which the two radicals $R_6$ and $R_7$ together with the adjacent carbon atom can also form a 5-membered or 6-membered cycloaliphatic ring and in which preferably not more than one of the radicals represents hydrogen, and $R_8$ represents a divalent aliphatic hydrocarbon radical having 2 to 6 carbon atoms, with the proviso that 2 or 3 carbon atoms are present between the two nitrogen atoms or between the nitrogen and the oxygen atom.

Compounds which contain structural units (VI) are prepared in a known manner by reaction of suitable carbonyl compounds of the formula

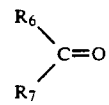

with aliphatic primary and/or secondary 1,2- or 1,3-diamines by heating the starting compounds in a water separator until the theoretical amount of water has been eliminated or the water separation is completed.

Examples of carbonyl compounds which are suitable for this reaction are acetone, methyl ethyl ketone, methyl propyl ketone, methyl isopropyl ketone, methyl n-butyl ketone, methyl isobutyl ketone, methyl n-amyl ketone, methyl isoamyl ketone, methyl heptyl ketone, diethyl ketone, ethyl butyl ketone, ethyl amyl ketone, diisopropyl ketone, diisobutyl ketone, cyclohexanone, isophorone, methyl tert.-butyl ketone, 5-methyl-3-heptanone, 4-heptyl ketone, 1-phenyl-2-propanone, acetophenone, methyl nonyl ketone, 3,3,5-trimethylcyclohexanone, formaldehyde, acetaldehyde, propionaldehyde, butyraldehyde, isobutyraldehyde, trimethylacetaldehyde, 2,2-dimethylpropanal, 2-ethylhexanal, 3-cyclohexene-1-carboxaldehyde, hexanal, heptanal, octanal, valeraldehyde, benzaldehyde, tetrahydrobenzaldehyde, propargylaldehyde, p-tolylaldehyde, 2-methylpentanal, phenylethanal or 4-methylpentanal.

Examples of 1,2- or 1,3-diamines which are suitable for the reaction are ethylenediamine, 1,2-propylenediamine, 1,3-propylenediamine, 1,2-butylenediamine or 1,3-butylenediamine. The only criterion of the suitability of the polyamines is the presence of two amino groups in the 1,2- or 1,3-position. Accordingly higher-functional polyamines are also suitable as amine components in which this condition is present, such as, for example, diethylenetriamine or dipropylenetriamine.

Compounds which contain the structural units of the formula (VII) are obtained completely analogously thereto from the carbonyl compounds mentioned by way of example and suitable amino alcohols in which 2 or 3 carbon atoms are present between the hydroxyl and primary or secondary amino groups.

Examples of suitable amino alcohols are bis-(2-hydroxyethyl)-amine, bis-(2-hydroxypropyl)-amine, bis-(2-hydroxybutyl)-amine, bis-(3-hydroxypropyl)-amine, bis-(3-hydroxyhexyl)-amine, N-(2-hydroxypropyl)-N-(2-hydroxyethyl)-amine, 2-(methylamino)- ethanol, 2-(ethylamino)-ethanol, 2-(propylamino)-ethanol, 2-(butylamino)-ethanol, 2-(hexylamino)-ethanol, 2-(cyclohexylamino)-ethanol, 2-amino-2-propyl-1-propanol, 2-amino-2-methyl-1,3-propanediol, 2-amino-3-methyl-3-hydroxybutane, propanolamine or ethanolamine.

Compounds which contain the structural units of the formula (VIII) are obtained completely analogously by reaction of the carbonyl compounds mentioned by way of example with primary amines, preferably diamines, in which more than 3 carbon atoms are present between the two amino groups.

Examples of this type of diamines are hexamethylenediamine, isophoronediamine, bis-(4-aminocyclohexyl)-methane, bis-aminomethylhexahydro-4,7-methanoindane, 1,4-cyclohexanediamine, 1,3-cyclohexanediamine, 2-methylcyclohexanediamine, 4-methylcyclohexanediamine, 2,2,5-trimethylhexanediamine, 2,2,4-trimethylhexanediamine, 1,4-butanediol bis-(3-aminopropyl) ether, 2,5-diamino-2,5-dimethylhexane, bis-(aminomethyl)cyclohexane, bis-(4-amino-3,5-dimethylcyclohexyl)-methane.

To prepare the aldimines or ketimines, it is also possible to use prepolymers having primary amino groups, that is, compounds having at least two terminal primary amino groups and a molecular weight of up to 5000, amino(polyethers) known per se from polyurethane chemistry, such as are described, for example, in EP-A 0,081,701, or, for example, reaction products of at least difunctional dicarboxylic acids, isocyanates or epoxides with polyamines, where the reaction products contain amide, urethane or urea groups and at least two amino groups, of which at least one is a primary amino group. In the case where polyamines, such as, for example, diethylenetriamine or dipropylenetriamine are used, not only structural units of the formula (VI) but also those of the formula (VIII) are obtained.

Compounds which are suitable as component B) and contain structural units of the formulae (VI), (VII) and/or (VIII) in addition to those of the formulae (IV) and/or (V) can be obtained by linking compounds having the structural units mentioned and at least one active hydrogen atom, (preferably at least one hydroxyl, primary amino or secondary amino group) with modifying agents of the type mentioned below by way of example.

Compounds which contain structural units of the formulae (IV) or (V) and at the same time active hydrogen atoms, in particular hydroxyl or primary or secondary amino groups, and constitute the precursor for the modifying reaction can be obtained, for example, by using, for the preparation of the oxazoline, oxazine, dihydroimidazole or tetrahydropyrimidine precursors, hydroxyl-containing carboxylic acids, such as, for example, 2-hydroxyacetic acid, triamines, such as, for example, diethylenetriamine or dipropylenetriamine, or amino alcohols having a total of at least three amino and hydroxyl groups, such as, for example, 2-(2-aminoethylamino)-ethanol and/or by reacting the precursors mentioned with hydroxyl-containing epoxides, such as, for example, epoxy- and hydroxyl-containing epoxy resins or with hydroxyl-containing cyclic carbonates, such as, for example, glycerol carbonate, in accordance with the details given above.

Compounds which contain structural units of the formulae (VI), (VII) or (VIII) and active hydrogen atoms of the type mentioned can be obtained by a large number of methods.

Polyamines which contain ketimine or aldimine groups and additionally at least one free primary or secondary amino group are obtained, for example, by reaction of at least difunctional amines with ketones and/or aldehydes in such equivalent ratios that at least one amino group remains free.

Likewise, if, for example, those polyamines are used which have at least a secondary amino group in addition to two primary amino groups their reaction with aldehydes or ketones affords aldimines or ketimines having at least one free secondary amino group (if an equivalent ratio of primary amino groups to carbonyl groups of 1:1 was maintained) or additionally containing free primary amino groups in addition to at least one secondary amino group (if the carbonyl compounds, relative to the primary amino groups, were used in less than the stoichiometric amount). Examples of this type of primary-secondary polyamines are diethylenetriamine, triethylenetetramine, tetraethylenepentamine, dipropylenetriamine, and tripropylenetriamine.

Compounds containing oxazolane or oxazane groups and carrying active hydrogen atoms of the type mentioned are formed, for example, by reaction of hydroxyamines which apart from a hydroxyl group and a secondary amino group additionally contain at least one further hydroxyl group and/or primary or secondary amino group.

Compounds containing hexahydropyrimidine or tetrahydroimidazole groups and furthermore at least one active hydrogen atom of the type mentioned are formed by using hydroxydiamines or triamines of the type already mentioned above by way of example for the preparation of hexahydropyrimidines or tetrahydroimidazoles.

To prepare higher-functional compounds which contain not only structural units of the formulae (IV) or (V) but also of the formulae (VI), (VII) or (VIII), the precursors mentioned which contain active hydrogen atoms are reacted with suitable modifying agents, leading to a linking of the structural elements mentioned with the formation of, for example, ester, ether, amide, urea and/or urethane bonds completely analogously to the bicyclic amide aminal crosslinking agents (8) described above.

Suitable modifying agents are in particular organic polyisocyanates, polyepoxides, polycarboxylic acids, polycarboxylic anhydrides, lower polycarboxylic esters, in particular methyl esters or compounds having at least two olefinically unsaturated double bonds which react with secondary amines in an addition reaction.

Examples of polyisocyanates which are suitable for this modifying reaction are aliphatic, cycloaliphatic, araliphatic, aromatic or heterocyclic polyisocyanates, such as are described, for example, by W. Siefken in Justus Liebigs Annalen der Chemie, 562, p. 75 to 136, for example 1,4-tetramethylene diisocyanate, 1,6-hexamethylene diisocyanate, 1,12-dodecane diisocyanate, cyclobutane 1,3-diisocyanate, cyclohexane 1,3-diisocyanate, cyclohexane 1,4-diisocyanate, 1-isocyanato-3,3,5-trimethyl-5-isocyanatomethyl-cyclohexane, 1,4- and 2,6-hexahydrotoluylene diisocyanate, hexahydro-1,3- and -1,4-phenylene diisocyanate, perhydro-2,4'- and/or -4,4'-diphenylmethyl diisocyanate, 1,3-phenylene diisocyanate, 1,4-phenylene diisocyanate, diphenylmethane 2,4'- and/or 4,4'-diisocyanate, naphthylene 1,5-diisocyanate, mixtures of these and other polyisocyanates, polyisocyanates having carbodiimide groups (for example German Patent Specification 1,092,007), polyisocyanates having allophanate groups (for example GB Patent Specification 994,890), polyisocyanates having isocyanurate groups (for example German Patent Specification 1,022,789, German Patent Specification 1,222,067), polyisocyanates having urethane groups (for example U.S. Pat. No. 3,394,164) or polyisocyanates prepared by reaction of at least difunctional hydroxyl compounds with excess of at least difunctional isocyanates, polyisocyanates having biuret groups (for example German Patent Specification 1,101,394) and prepolymer or polymer substances having at least two isocyanate groups.

Representative examples of these compounds to be used according to the invention are described, for example, in High Polymers, Volume XVI, "Polyurethanes, Chemistry and Technology" Interscience Publishers, New York, London, Volume I, 1962, p. 32-42 and 45-54 and Volume II, 1964, p. 5-6 and 198-199, and also in Kunststoffhandbuch (Handbook of Plastics), Volume VII, Vieweg-Höchtlen, CarlHanser-Verlag, Munich, 1966, p. 45-71.

Examples of polyepoxides suitable for the modifying reaction mentioned are aliphatic, cycloaliphatic, araliphatic, aromatic and heterocyclic substances containing at least two epoxy groups, such as, for example, epoxidized esters of aliphatic polybasic acids with unsaturated monohydric alcohols, glycidyl ethers of polyhydroxy compounds, glycidyl esters of polycarboxylic acids, and epoxy-containing copolymers.

Examples of polycarboxylic acids suitable for the modifying reaction are aliphatic, cycloaliphatic, araliphatic, aromatic and heterocyclic substances containing at least two carboxyl groups, such as, for example, adipic acid, dimeric fatty acid, phthalic acid, terephthalic acid, isophthalic acid, fumaric acid, maleic acid, succinic acid, trimellitic acid, pyromellitic acid, copolymers containing (meth)acrylic acid, acidic polyesters or acidic polyamides.

Instead of the acids mentioned by way of example, it is also possible to use the corresponding acid anhydrides (if the acids are those which form intramolecular anhydrides) or the corresponding simple alkyl esters, in particular methyl esters, for the modifying reaction.

Compounds suitable for the modifying reaction and containing at least two olefinic double bonds of the type mentioned are in particular derivatives of acrylic acid or methacrylic acid, such as, for example, hexanediol bis(meth)acrylate, trimethylolpropane tris(meth)acrylate, pentaerythritol tetra(meth)acrylate, OH-functional polyesters or polyacrylates which are esterified with acrylic acid, diethylene glycol dimethacrylate, reaction products of polyepoxides with (meth)acrylic acid or reaction products of polyisocyanates with hydroxyalkyl (meth)acrylate.

An analogous modifying reaction exclusively using those precursors which contain structural units (IV) or (V) which constitute an essential aspect of the invention is of course also possible. The modifying reaction for the preparation of higher-functional compounds makes it thus possible to prepare a large range of components B).

The modifying reaction is usually carried out in a solvent of the type mentioned above by way of example at reaction temperatures of 30° to 180° C., if appropriate in a water separator.

As a rule, in this reaction an equivalent ratio of reactive group of the blocked polyamines to the reactive groups of the "modifying agent" is chosen. However, it is also possible to use the "modifying agent" in less than an equivalent ratio, for example using 0.75 to 0.99-fold equivalent amounts.

If in the modifying reaction in addition to the bicyclic amide acetals or bicyclic amide aminals further blocked polyamines of the type mentioned by way of example, which have groups which are reactive towards the "modifying agent", the maximum amounts in which they are used are such that on average a maximum number of 10, preferably a maximum number of 5, aldimine, ketimine, oxazane, oxazolane, hexahydropyrimidine, tetrahydroimidazole groups are present in the resulting modified reaction product for each bicyclic amide acetal or bicyclic amide aminal group.

Component B) which is an essential feature of the invention comprises not only compounds whose blocked amino groups are exclusively those of the structure (IV) or (V) but also those which in addition to these structural units also have structural units of the formulae (VI), (VII) and/or (VIII). Both types of compounds which are suitable according to the invention can additionally also contain free active hydrogen atoms, in particular hydroxyl, primary amino or secondary amino groups, which, when the process according to the invention is carried out, may already react with some of the acid anhydride groups in the absence of moisture.

When the process according to the invention is carried out, it is possible also to use further blocked polyamines which are free from bicyclic amide acetal or bicyclic amide aminal groups as auxiliaries or additives, if desired in addition to further auxiliaries and additives. These are in particular aldimines, ketimines, oxazanes, oxazolanes, hexahydropyrimidines, tetrahydroimidazoles which are not linked chemically with the bicyclic amide acetals or amide aminals which are an essential feature of the invention. It is possible to use not only those compounds of the type mentioned above by way of example which have hydroxyl or amino groups but also those which are inert towards acid anhydride groups in the absence of moisture. The preparation of these auxiliaries and additives takes place in accordance with the details given above, although the type and relative amounts of the starting materials used for the preparation of the blocked amines are chosen such that no more free hydroxyl or primary or secondary amino groups are present.

If these auxiliaries and additives are used at all in the process according to the invention, they are used in such amounts that in the ultimately obtained binder combinations according to the invention at least 10, preferably at least 20 mole % of the blocked amino groups are bicyclic amide acetal or bicyclic amide aminal groups, in which not only these groups which are present in component B) but also the other blocked amino groups which may be present in component B) and also the blocked amino groups which have been added in the form of the auxiliaries and additives of the last-mentioned type are included in the calculation.

The process according to the invention is carried out such that the starting components A) and B) and also the optionally used auxiliaries and additives are mixed with one another, it being possible for inert organic solvents or diluents of the type already mentioned above by way of example to be present before, during or after the preparation of the mixtures of the individual components. If desired, these solvents or diluents can also be present as early as during the preparation of one or more starting components, such as has been described, for example, above in the preparation of the copolymers containing succinic anhydride. Further examples of suitable solvents or diluents for the preparation of the binder combination are alcohols, which in certain cases affect the properties of the binder combinations. Examples of suitable alcohols are ethanol, n-propanol, iso-propanol, n-butanol, sec.-butanol, tert.-butanol, n-pentanol, iso-pentanol, n-hexanol, octanol, methylglycol, ethylglycol, propylglycol, isopropylglycol, butylglycol, methyldiglycol, ethyldiglycol, propylglycol monomethyl ether, tripropylene glycol monomethyl ether, dipropylene glycol monomethyl ether, alkyl glycolate, alkyl lactate, 2-ethylbutanol, 2-ethylhexanol, 3-methoxybutanol, diacetone alcohol, furfuryl alcohol, tetrahydrofurfuryl alcohol. The solvents and diluents should be essentially anhydrous to ensure a sufficient pot life of the mixture. Solvents and diluents are in general used in such amounts which are required for establishing suitable processing viscosities of the combinations according to the invention. The solids content of the combination according to the invention to be used according to the invention is usually between 20 and 90% by weight. However, by using suitable low-molecular-weight copolymers containing succinic anhydride it is in principle also possible to reduce the solvents or diluent content even further.

According to a preferred embodiment of the process according to the invention, the only blocked polyamines used are compounds B) which do not contain any groups which are reactive towards anhydride groups in the absence of moisture and whose blocked amino groups exclusively consist of bicyclic amide acetal and/or bicyclic amide aminal groups of the type mentioned.

The preferred compositions according to the invention thus prepared contain 65 to 95 parts by weight of polyanhydrides A) and 5 to 45 parts by weight of compounds B) containing bicyclic amide acetal groups or bicyclic amide aminal groups.

If bicyclic amide acetals or bicyclic amide aminals are used as component B) or compounds having blocked amino groups are used as auxiliaries and additives which contain groups which are reactive towards acid anhydride groups in the absence of moisture, that is, in particular hydroxyl, primary or secondary amino groups, the resulting products of the process are complex mixtures in which amide or ester groups containing reaction products of copolymers A) with reactive compounds B) or reactive blocked polyamines used as auxiliary or additive are present. In addition to these reaction products, the products obtained in the process can also contain excess unconverted copolymers A) or optionally used block polyamines which are inert towards acid anhydride groups. The reaction products mentioned which contain amide or ester groups can be not only reaction products which contain blocked amino groups (reaction products from copolymers A) with hexahydropyrimidines, tetrahydroimidazoles, aldimines, ketimines, oxazanes, oxazolanes, bicyclic amide acetals, bicyclic amide aminals having chemically bound active hydrogen atoms, but also reaction products which do not have any blocked amino groups (reaction products of copolymers A) with polyamines or hydroxyamines of the type used for their preparation which may be present in a mixture with blocked polyamines). The reason for this is that "blocked polyamines having hydrogen atoms reactive towards acid anhydride groups" are to be understood to mean in the context of the invention not only those blocked polyamines which contain reactive hydrogen atoms in chemically bound form, but rather also those which are present in a mixture with excess polyamine or hydroxyamine used for their preparation.

In all variations of the procedure of the process according to the invention, the type and relative amounts of the individual components are moreover chosen such that, taking into account the reaction between acid anhydride or possibly epoxy group and the groups which are reactive towards acid anhydride or epoxy groups, in particular amino or hydroxyl groups, which may proceed spontaneously, in the ultimately obtained binder combinations, 0.25 to 50, preferably 0.5 to 10 and in particular preferably 0.6 to 5, anhydride groups are present for each bicyclic amide acetal or bicyclic amide aminal group. A relatively large excess of anhydride groups compared to the blocked amino groups mentioned is advisable if these are present together with other blocked amino groups of the type mentioned. Preferably, the molar ratio of acid anhydride groups to all blocked amino groups is 0.5:1 to 2:1, after completion of the reaction, which may occur spontaneously, between acid anhydride groups and groups which are reactive towards acid anhydride groups.

With respect to the usability of the products of the process according to the invention, it is essentially unimportant whether the reaction, which may occur spontaneously, between copolymers A) and the groups which are reactive towards acid anhydride groups is already completely finished. However, it may be desirable to complete this reaction by heating to 40° to 100° C. for a short time, before the products of the process are used according to the invention. Otherwise the process according to the invention is preferably carried out at room temperature.

When the process according to the invention is carried out, it is of course possible to use any desired mixtures of different individual components A) and B).

The products of the process according to the invention are in general liquid at room temperature, are sufficiently stable on storage in the absence of water and, after application to substrate, usually cure rapidly in the presence of air moisture.

As a rule, crosslinked films are obtained at as low as room temperature. The curing which is already very rapid per se can be accelerated even more by drying at elevated temperatures. Temperatures of 80° to 130° C. and drying times of 10 to 30 minutes are advantageous.

If particularly hydrolytically stable blocked amino groups are used, this accelerated drying at high temperatures may be necessary to obtain the optimum property profile.

The paints and coating materials containing the products of the process according to the invention as binders and being used according to the invention can contain auxiliaries and additives customary in paint technology, such as, for example, pigments, fillers, flow-improving agents, antioxidants or UV absorbers.

These auxiliaries and additives should be as anhydrous as possible and are incorporated in the starting components, in general the component A), preferably even before the process according to the invention is carried out.

The paints and coating compounds containing the products of the process according to the invention as binders have in general pot lives of 1 to 24 hours in the absence of moisture. However, by choosing suitable reactants, it is possible to increase or reduce the pot life as desired. The paints and coating compounds can be applied to any desired substrates which may already have been pretreated, such as, for example, metal, wood, glass, ceramic, stone, concrete, plastics, textiles, leather, cardboard or paper by conventional methods, for example by spray-coating, spread-coating, dip-coating, flooding, casting, and roller-coating.

In the examples which follow, all percentages and parts are by weight, unless noted otherwise.

EXAMPLES

General procedure for copolymers A) containing anhydride groups.

Part I is initially introduced into a 5 L reaction vessel equipped with stirring, cooling and heating means, and the mixture is heated to the reaction temperature. Part II (addition over a total period of 2.5 hours) and part III (addition over a total period of 3 hours) are metered in in parallel. Stirring is subsequently continued for 2 hours at the reaction temperature.

The reaction temperatures and the compositions of parts I to III are listed in Table 1 together with the characteristic values of the copolymers obtained.

TABLE 1

|  | (Amounts given in g) | | | | | | | |
|---|---|---|---|---|---|---|---|---|
|  | Copolymers | | | | | | | |
|  | $A_1$ | $A_2$ | $A_3$ | $A_4$ | $A_5$ | $A_6$ | $A_7$ | $A_8$ |
| Part I | | | | | | | | |
| Butyl acetate | 1400 | 1400 | 1400 | 1400 | 1400 | | | |
| Methoxypropyl acetate | | | | | | | 1891 | 1891 |
| Xylene | | | | | | 1600 | | |
| Part II | | | | | | | | |
| Methyl methacrylate | 917 | 1025 | 793 | | 635 | 1198 | | |
| Butyl methacrylate | | | | 937 | | 448 | | |
| Ethyl acrylate | | | | 703 | | | | |
| Butyl acrylate | 836 | 732 | 939 | | 976 | | 563 | 563 |
| Styrene | 284 | 341 | 305 | 351 | 365 | 336 | 1013 | 1013 |
| Maleic anhydride | 305 | 244 | 305 | 351 | 366 | 168 | 235 | 300 |
| Glycidyl methacrylate | | | | | | 65 | | |
| Part III | | | | | | | | |
| tert.-Butyl peroctoate (70% strength) | 140 | 140 | 140 | 140 | 140 | 128 | 233 | 233 |
| Butyl acetate | 118 | 118 | 118 | 118 | 118 | 122 | | |
| Reaction temperature (°C.) | 120 | 120 | 120 | 120 | 120 | 120 | 145 | 145 |
| Solids content (%) | 60,1 | 60,4 | 59,6 | 60,0 | 59,8 | 55,8 | 50,5 | 49,3 |
| Anhydride content of the solids ($C_4H_2O_3$, %) | 12,50 | 10,00 | 12,50 | 14,40 | 15,00 | 7,50 | 11,50 | 14,72 |

II Preparation Process for Components B) Containing Bicyclic Amide Acetals or Bicyclic Amide Aminals II. 1 Preparation of the Bicyclic Amide Acetals II. 1.1 Monofunctional Oxazolines As Starting Compounds All oxazolines are prepared by reaction of a carboxylic acid or its anhydride with the corresponding amine by heating to reflux in toluene or xylene with azeotropic removal of the water of the reaction[1] or without a solvent by distillation of the oxazoline/water mixture into a receiving flask charged with ether[2]. The crude products are purified by distillation.

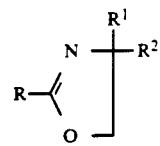

| Product | R | $R^1$ | $R^2$ |
|---|---|---|---|
| $b_1$ | H | $CH_3$ | $CH_3$ |
| $b_2$ | H | $CH_3$ | $CH_2OH$ |
| $b_3$ | $C_2H_5$ | H | H |
| $b_4$ | $C_2H_5$ | $CH_3$ | $CH_2OH$ |

[1] H. L. Wehrmeister, J. Org. Chem., 26, 3821 (1961)
[2] L.-F. Tietze and Th. Eicher, Reaktionen und Synthesen im organisch-chemischen Praktikum (Reactions and syntheses in the organic chemistry lab), Georg Thieme Verlag Stuttgart, New York 1981

II. 1.2 Difunctional Oxazolines As Starting Compounds

Difunctional oxazolines are prepared by reaction of two equivalents of monooxazolines with one equivalent of a diisocyanate.

| Product | R | $R^1$ | $R^2$ |
|---|---|---|---|
| $b_5$ | H | $CH_3$ | $-(CH_2)_6-$ |
| $b_6$ | $C_2H_5$ | $CH_3$ | 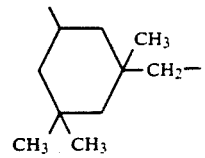 |

II. 1.3 Components B) Containing Bicyclic Amide Acetals

Crosslinking Agent B1

Prepared by heating 99 g of b$_3$, 88 g of ethylene carbonate and 0.4 g of lithium chloride at 150° C. for 12 hours. After distillation colourless liquid.

Crosslinking Agent B2

Analogously to B1 from 99 g of b$_3$, 120 g of styrene oxide and 0.4 g of lithium chloride, at 150° C. for 6 hours After distillation colourless liquid.

Crosslinking Agent B3

Analogously to B1 from 99 g of b$_3$, 150 g of phenyl glycidyl ether and 0.4 g of lithium chloride. 6 hours at 150° C. After distillation colourless crystals.

Crosslinking Agent B4

Analogously to B1 from 99 g of b$_3$, 186 g of 2-ethylhexyl glycidyl ether and 0.4 g of lithium chloride. 6 hours at 150° C. After distillation colourless liquid.

Crosslinking Agent B5

Analogously to B1 from 99 g of b$_3$, 74 g of glycidyl and 0.4 g of lithium chloride. 8 hours 150° C. After dilution to 80% with N-methylpyrrolidone orange-yellow viscous liquid.

Crosslinking Agent B6

Analogously to B1 from 99 g of b$_3$, 120 g of styrene oxide and 0.4 g of lithium chloride. 6 hours at 120° C. After distillation colourless liquid.

Crosslinking Agent B7

Analogously to B1 from 99 g of b$_3$, 108 g of neopentyl glycol diglycidyl ether and 0.4 g of lithium chloride. 8 hours at 150° C. After dilution to 80% with toluene yellow viscous liquid.

Crosslinking Agent B8

Analogously to B1 from 200 g of b$_3$, 120 g of styrene oxide and 0.4 g of lithium chloride. 6 hours at 150° C. After dilution to 70% with N-methylpyrrolidone orange-yellow viscous liquid.

Crosslinking Agent B9

Analogously to B1 from 127 g of b$_6$, 93 g of 2-ethylhexyl glycidyl ether and 0.2 g of lithium chloride. 6 hours at 150° C. After dilution to 80% with butyl acetate yellow viscous liquid.

II.2 Preparation of the Bicyclic Amide Aminals

Crosslinking Agent B10

Reaction of 528 g of 1-amino-3-methylaminopropane and 360 g of acetic acid in 99 g of toluene gives, after elimination of the reaction water (theory: 216 g; found 212.5 g) at 110° to 130° C., a tetrahydropyrimidine precursor which after distillation is present in about 90% yield as a clear colourless liquid.

56 g of this tetrahydropyrimidine precursor are reacted in 66.7 g of methoxypropyl acetate with 44 g of ethylene carbonate in the presence of 1 g of LiCl. After the elimination of CO$_2$ is completed, the reaction mixture is distilled, and a slightly yellow-coloured product, the bicyclic amide aminal B10, is isolated.

Crosslinking Agent B11

112 g of tetrahydropyrimidine precursor from B10 are reacted in 200 g of butyl acetate with 87 g of ethylene glycol diglycidyl ether at 120° to 130° C. for 5 hours. After the addition of activated carbon stirring is continued for 1 hour, the solid is filtered off under an N$_2$ atmosphere and an approximately 50% strength, yellow-coloured solution of the difunctional bicyclic amide aminal B11 is obtained.

Crosslinking Agent B12

572 g of dimeric fatty acid (Empol 1022, Unichema) and 176 g of 1-amino-3-methylaminopropane are heated in 187 g of toluene in the presence of 0.75 g of catalyst (dibutyl tin oxide) until the elimination of water is completed. Removal of the solvent and unconverted amine by distillation gives a bis-tetrahydropyrimidine as a yellow oil. 75 g of this precursor are dissolved in 63 g of Solvent Naphtha, 1 g of lithium chloride add, and the mixture is then reacted with 24 g of styrene oxide at 140° C. After the reaction is completed, activated carbon is added, the reaction solution is filtered off while hot under an N$_2$ atmosphere, and the filtrate is then diluted to 40% of solids content with methyl ethyle ketone. In this manner, the difunctional bicyclic amide aminal crosslinking B12 is obtained.

Crosslinking Agent B13

First 624 g of 2-(2-aminoethylamino)-ethanol and 360 g of acetic acid in 96 g of toluene are heated in the presence of 1 g of catalyst to the reflux temperature until all of the water is eliminated. Distillation gives a hydroxylfunctional dihydroimidazole as a colourless crystalline product.

51.5 g of this precursor are reacted in 29.3 g of methoxypropyl acetate at 80° C. with 31.9 g of hexamethylene diisocyanate to give a bis-dihydroimidazole containing urethane groups.

After the addition of 28.0 g of epoxybutane and 1 g of lithium chloride, the reaction mixture is heated at 120° C. for 6 hours, diluted to a solids content of 40% with methyl ethyl ketone and, after purification with activated carbon, filtered. This gives the difunctional bicyclic amide aminal B13.

II.3 Preparation of Crosslinking Agents Also Containing, in Addition to Bicyclic Amide Aminals or Amide Acetals, Other Reactive Amino Groups in Blocked Form

Crosslinking Agent B14

25.6 g of the hydroxyl-functional dihydroimidazole described in the preparation of crosslinking agent B13 are reacted with 43 g of an oxazolane from diethanolamine and 2-ethylhexanal and also with 32.9 g of hexamethylene diisocyanate. Dilution with methoxypropyl acetate gives a light yellow solution of a product which on average contains one dihydroimidazole and one oxazolane group each. Reaction of this product with 22 g of ethylene carbonate gives, after the elimination of CO$_2$ is completed, cross-linking agent B14 having oxazolane and bicyclic amide aminal structures as an approximately 50% strength solution.

Crosslinking Agent B15

25.6 g of the hydroxyl-functional dihydroimidazole described in the preparation of crosslinking agent B13 and 28.5 g of a hexahydropyrimidine from 1-amino-3-methylaminopropane and isobutyraldehyde are reacted in 87 g of methoxypropyl acetate with 32.9 g of hexamethylene diisocyanate. The dihydroimidazole structure is then converted to a bicyclic amide aminal by reaction with 22 g of ethylene carbonate. In this manner, crosslinking agent B15 is obtained, which contains on average one hexahydropyrimidine and one bicyclic amide aminal structure each. Dilution with 43.5 g of acetone gives an approximately 40% strength solution of B15.

III. Preparation of the Binder Combinations According to the Invention

Components A) containing anhydride groups and components B) containing bicyclic amide acetals or bicyclic amide aminals are mixed with one another at room temperature and are, if necessary, adjusted to a processable viscosity by the addition of an organic solvent or diluent. The films are applied to test panels by means of a film applicator to a wet film thickness of 180 um. After physical drying, a second coating layer is applied on top of the first one under identical conditions. The films applied at room temperature were all dried to a non-tacky state after no more than 60 minutes. After ageing, that is, drying at room temperature for about 24 hours, clear crosslinked films having good film-optical and mechanical values are obtained.

The paint mixtures prepared have without exception a pot life of several hours.

The table which follows shows the compositions of the binder combinations and the solvent resistance as indication of the degree of crosslinking.

The solvent resistance is tested by means of a wipe test using a cotton swab soaked in methyl isobutyl ketone (MIBK). The table shows the number of double strokes after which the film remains without any visible change. No more than 100 double strokes per film were carried out.

|  | Use Example | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Component A (g) | 20.0 $A_5$ | 20.0 $A_2$ | 20.0 $A_4$ | 20.0 $A_3$ | 20.0 $A_1$ | 20.0 $A_6$ | 20.0 $A_7$ | 20.0 $A_8$ | 20.0 $A_2$ | 20.0 $A_5$ | 20.0 $A_2$ | 20.0 $A_6$ |
| Component B (g) | 4.1 $B_2$ | 2.7 $B_2$ | 4.0 $B_2$ | 3.4 $B_2$ | 3.4 $B_2$ | 1.9 $B_2$ | 3.1 $B_2$ | 3.4 $B_2$ | 1.8 $B_1$ | 4.6 $B_3$ | 3.6 $B_4$ | 2.1 $B_5$ |
| Butyl acetate (g) | 4.0 | 4.0 | 4.0 | 4.0 | 4.0 | 4.0 | 4.0 | 4.0 | 4.0 | 10.0 | 4.0 | 4.0 |
| Pot life | >1 h | >2 h | >1 h | >2 h | >2 h | >3 h | 4 h | 2 h | >2 h | >3 h | >2 h | >3 h |
| Appearance of the film | clear, bright | clear, bright | clear, bright | clear, bright | clear, bright | clear, bright | clear, bright | clear, bright | clear, bright | clear, bright | clear, bright | clear, bright |
| MIBK wipe test after 24 hours at room temperature, number of double strokes | >100 | >100 | >100 | >100 | >100 | >100 | >100 | >100 | >100 | >100 | >100 | >100 |
| Molar ratio of anhydride:bicyclic amide acetal or amide aminal, oxazolane, hexahydropyrimidine | 1:1 | 1:1 | 1:1 | 1:1 | 1:1 | 1:1 | 1:1 | 1:1 | 1:1 | 1:1 | 1:1 | 1:1 |

|  | Use Example | | | | | | | | | |
|---|---|---|---|---|---|---|---|---|---|---|
|  | 13 | 14 | 15 | 16 | 17 | 18 | 19 | 20 | 21 | 22 |
| Component A (g) | 20.0 $A_3$ | 20.0 $A_1$ | 20.0 $A_3$ | 20.0 $A_4$ | 67.25 $A_8$ | 67.25 $A_8$ | 67.25 $A_8$ | 67.25 $A_8$ | 67.25 $A_8$ | 67.25 $A_8$ |
| Component B (g) | 8.6 $B_9$ | 3.4 $B_6$ | 8.1 $B_7$ | 8.2 $B_8$ | 8.8 $B_{10}$ | 19.1 $B_{11}$ | 57.1 $B_{12}$ | 35.5 $B_{13}$ | 27.6 $B_{14}$ | 30.0 $B_{15}$ |
| Butyl acetate (g) | 5.0 | 5.0 | 10.0 | 10.0 | 30 | 43.5 |  |  |  |  |
| Methyl ethyl ketone |  |  |  |  |  |  | 10.0 | 8.0 | 12.0 | 5.5 |
| Pot life | >6 h | >4 h | >2 h | >2 h | >3 h | >2 h | >3 h | >3 h | >4 h | >2 h |
| Appearance of the film | clear, bright | clear, bright | clear, bright | clear, bright | clear, bright | clear, bright | clear, bright | clear, bright | clear, bright | clear, bright |
| MIBK wipe test after 24 hours at room temperature, number of double strokes | >100 | >100 | >100 | >100 | >80 | >100 | >100 | >100 | >100 | >100 |
| Molar ratio of anhydride:bicyclic amide acetal or amide aminal, oxazolane, hexahydropyrimidine | 1:1 | 1:1 | 1:1 | 1:1 | 1:1 | 1:1 | 1:1 | 1:1 | 1:1 | 1:1 |

What is claimed is:

1. Moisture-curing binder composition comprising a moisture-free mixture of A) and B) or reaction product obtained in the absence of moisture of A) and B) wherein:

A) is 30 to 99 parts by weight of copolymers of
   a) 4.5 to 19 parts by weight of maleic anhydride;
   b) 45 to 85 parts by weight of at least one monomer of the formulae

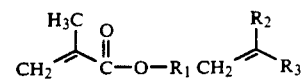

or both; and c) 5 to 65 parts by weight of at least one monomer of the formula

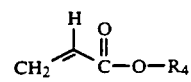

wherein $R_1$ and $R_4$ are the same or different and each represents an aliphatic or cycloaliphatic hydrocarbon radical having 1 to 18 carbon atoms with or without an interrupting oxygen, sulphur or nitrogen hetero atom.

$R_2$ represents hydrogen, methyl, ethyl, chloro or fluoro and

R₃ represents an aliphatic hydrocarbon radical having 2 to 15 carbon atoms, a cycloaliphatic hydrocarbon radical having 5 to 10 carbon atoms, an araliphatic hydrocarbon radical having 7 to 18 carbon atoms, an aromatic hydrocarbon radical having 6 to 12 carbon atoms, chloro, fluoro, nitrile or a hydrocarbon radical having 2 to 18 carbon atoms and containing one or more hetero atoms comprising oxygen, sulphur and nitrogen in the form of ether, ester, amide, urethane, urea, thioester, thioether, oxirane, ketone, lactam or or lactone groups said copolymers having a molecular weight of 1500 to 75,000, determined by gel permeation chromatography and B) is 1 to 70 parts by weight of organic compounds having blocked amino groups, wherein B)
comprises organic compounds containing hydrogen atoms which are reactive to acid anhydride groups and contain bicyclic amide aminal groups, but do not contain bicyclic amide acetal groups wherein the ratios of the amounts of the individual components are chosen such that, by taking into account reaction which occurs spontaneously between components A) and B) in the absence of moisture, in the resulting mixture 0.25 to 50 anhydride groups are present per bicyclic amide aminal group.

2. Moisture-curing binder composition according to claim 1 wherein component A) is a copolymer containing 100 parts by weight of maleic anhydride copolymerized with 40 to 140 parts by weight of monomers selected from the group consisting of styrene, vinyltoluene, α-methylstyrene, α-ethylstyrene, ring-substituted diethyl styrenes, isopropylstyrenes, butylstyrenes methoxystyrenes, ethyl vinyl ether, n-propyl vinyl ether, isopropyl vinyl ether, n-butyl vinyl ether, isobutyl vinyl ether, vinyl acetate, vinyl propionate, vinyl butyrate and any mixture thereof.

3. Moisture-curing binder composition according to claim 1 wherein component B) compounds have an average molecular weight of 115 to 30,000, determined by gel permeation chromatography, and contain 0.5 to 4 structural units of the formula

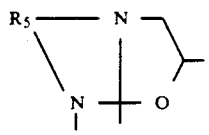

wherein
R₅ represents a divalent aliphatic hydrocarbon radical having 2 to 10 carbon atoms, with the proviso 2 or 3 carbon atoms are present between the two hetero atoms and wherein said radical is unsubstituted or substituted by hydroxyl groups.

4. Moisture-curing binder composition according to claim 3 wherein the component B) compounds further contains (i) hydroxyl, primary amino or secondary amino reactive acid anhydride groups or (ii) reversibly blocked amino groups non-reactive to acid anhydride groups which are selected from the group consisting of oxazolone, aldimine, ketimine, oxazane, hexahydropyrimidine and tetrahydroimidazole.

5. Moisture-curing binder composition according to claim 1 which further comprises crosslinking agents which have reversibly blocked amino groups selected from the group consisting of oxazane, oxazolane, aldimine, ketimine, hexahydropyrimidine and tetrahydroimidazole groups, free from bicyclic amide acetal groups and bicyclic amide aminal groups and have hydroxyl or amino groups which are reactive to acid anhydride groups.

6. In an improved coating composition which comprises a binder which cures under the influence of moisture, the improvement comprises said binder being a moisture-curing binder composition according to claim 1.

7. A composition as claimed in claim 6 wherein the coating composition is a paint.

8. Moisture-curing binder composition comprising a moisture-free mixture of A) and B) or reaction product obtained in the absence of moisture of A) and B) wherein A) is 30 to 99 parts by weight of copolymers having a weight average molecular weight of from 1500 to 7500 containing both epoxy groups and intermolecular acid anhydride groups in copolymerized form and having an epoxy equivalent weight of from 568 to 14200 and an anhydride equivalent weight of from 392 to 9800 and having been obtained by copolymerizing
a) 1 to 20 parts by weight of copolymerizable, anhydride-functional monomers,
b) 1 to 20 parts by weight of copolymerizable epoxy-functional monomers and,
c) 40 to 98 parts by weight of one or more copolymerizable monomers of the formulae (I), (II), (III)

wherein
R₁ and R₄ are the same or different and each represents a linear or branched aliphatic hydrocarbon radical having 1 to 18 carbon atoms,
R₂ represents hydrogen, methyl, ethyl, chloro or fluoro,
R₃ represents an aromatic or araliphatic hydrocarbon radical having 6 to 12 carbon atoms, nitrile, carboxylate having 2 to 9 carbon atoms, alkoxy having 2 to 7 carbon atoms or aminocarbonyl which is unsubstituted or N-substituted by alkyl substituents having 1 to 6 carbon atoms,
is 1 to 70 parts by weight of organic compounds having blocked amino groups, wherein B)
comprises organic compounds containing hydrogen atoms which are reactive acid anhydride groups and contain bicyclic amide aminal groups, wherein the ratios of the amounts of the individual components are chosen such that, by taking into account the addition reaction which occurs spontaneously between components A) and B) in the absence of moisture, in the resulting mixture 0.25 to 50 anhydride groups are present per and bicyclic amide aminal group.

9. Moisture-curing binder composition according to claim 1 wherein component B) compounds have an average molecular weight of 115 to 30,000, determined by gel permeation chromatography, and contain 0.5 to 4 structural units of the formulae

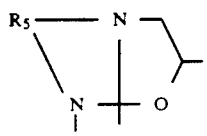

wherein
R$_5$ represents a divalent aliphatic hydrocarbon radical having 2 to 10 carbon atoms, with the proviso 2 or 3 carbon atoms are present between the two hetero atoms and wherein said radical is unsubstituted or substituted by hydroxyl groups.

10. Moisture-curing binder composition according to claim 9 wherein the component
B) compounds further contains (i) hydroxyl, primary amino or secondary amino reactive acid anhydride groups or (ii) reversibly blocked amino groups non-reactive to acid anhydride groups which are selected from the group consisting of oxazolone, aldimine, ketimine, oxazane, hexahydropyrimidine and tetrahydroimidazole.

11. Moisture-curing binder composition according to claim 9 which further comprises crosslinking agents which have reversibly blocked amino groups selected from the group consisting of oxazane, oxazolane, aldimine, ketimine, hexahydropyrimidine and tetrahydroimidazole groups, free from bicyclic amide acetal groups and bicyclic amide aminal groups and have hydroxyl or amino groups which are reactive to acid anhydride groups.

12. In an improved coating composition which comprises a binder which cures under the influence of moisture, the improvement comprises said binder being a moisture-curing binder composition according to claim 8.

13. A composition as claimed in claim 8 wherein the coating composition is a paint.

* * * * *